United States Patent
Huber

(10) Patent No.: US 12,344,345 B2
(45) Date of Patent: Jul. 1, 2025

(54) SUSPENSION HANDLEBAR ASSEMBLY AND STEM FOR BICYCLE

(71) Applicant: Christopher William Huber, San Jose, CA (US)

(72) Inventor: Christopher William Huber, San Jose, CA (US)

(*) Notice: Subject to any disclaimer, the term of this patent is extended or adjusted under 35 U.S.C. 154(b) by 0 days.

(21) Appl. No.: 18/535,901

(22) Filed: Dec. 11, 2023

(65) Prior Publication Data

US 2024/0227976 A1 Jul. 11, 2024

Related U.S. Application Data

(63) Continuation of application No. 17/988,610, filed on Nov. 16, 2022, now Pat. No. 11,840,304, which is a continuation of application No. 17/317,704, filed on May 11, 2021, now Pat. No. 11,511,825, which is a continuation-in-part of application No. 17/163,340, filed on Jan. 29, 2021, now abandoned.

(60) Provisional application No. 62/967,534, filed on Jan. 29, 2020.

(51) Int. Cl.
| | |
|---|---|
| *B62K 21/12* | (2006.01) |
| *B62K 21/14* | (2006.01) |
| *B62K 21/18* | (2006.01) |
| *B62K 21/20* | (2006.01) |
| *B62K 21/22* | (2006.01) |

(52) U.S. Cl.
CPC ............. *B62K 21/14* (2013.01); *B62K 21/12* (2013.01); *B62K 21/20* (2013.01); *B62K 21/22* (2013.01)

(58) Field of Classification Search
CPC ........ B62K 11/14; B62K 21/12; B62K 21/14; B62K 21/16; B62K 21/18; B62K 21/20; B62K 21/22
See application file for complete search history.

(56) References Cited

U.S. PATENT DOCUMENTS

| | | | |
|---|---|---|---|
| 897,579 A * | 9/1908 | Brannan | B62K 21/14 74/551.2 |
| 1,936,389 A | 11/1933 | Hallquist | |
| 2,452,371 A | 10/1948 | Guttormsen | |
| 5,320,374 A | 6/1994 | Farris | |

(Continued)

FOREIGN PATENT DOCUMENTS

| | | |
|---|---|---|
| CH | 667433 A5 | 10/1988 |
| CH | 682904 A5 | 12/1993 |

(Continued)

OTHER PUBLICATIONS

"The Geometry of Buke Handling," Wikstrom, Published Nov. 28, 2018 on bicyclingtips.com, url:<https://cyclingtips.com/2018/11/the-geometry-of-bike-handling-its-all-about-the-steering/>.

(Continued)

*Primary Examiner* — Adam D Rogers
(74) *Attorney, Agent, or Firm* — Gary L. Eastman, Esq.; Eastman. IP

(57) ABSTRACT

A bicycle handlebar stem or stem/handlebar assembly has an inclined linear travel approximately 45 degrees from horizontal. This inclined path mimics a rider's natural arm inclination and pitching moment. 45 degrees is nearly ideal for most dropped bar road bicycles but different style bicycles may have an ideal angle between 30 and 60 degrees.

12 Claims, 18 Drawing Sheets

(56) References Cited

U.S. PATENT DOCUMENTS

| | | | |
|---|---|---|---|
| 5,377,557 A | 1/1995 | Nastrucci | |
| 7,607,676 B1 | 10/2009 | Chu | |
| 8,550,484 B1 | 10/2013 | Draper | |
| 11,511,825 B2 | 11/2022 | Huber | |
| 11,840,304 B2 * | 12/2023 | Huber | B62K 21/12 |
| 2004/0262879 A1 | 12/2004 | Kinzler | |
| 2005/0127636 A1 | 6/2005 | Czysz | |
| 2009/0072459 A1 | 3/2009 | Tsai | |
| 2010/0199800 A1 | 8/2010 | Horie | |
| 2014/0174247 A1 | 6/2014 | Kovalak, Jr. | |
| 2017/0008596 A1 | 1/2017 | D'Aluisio | |
| 2017/0327180 A1 | 11/2017 | Hasenyager | |
| 2018/0135726 A1 | 5/2018 | Kita | |
| 2018/0195572 A1 | 7/2018 | Kashani | |
| 2021/0018950 A1 | 1/2021 | Cooper | |
| 2021/0276658 A1 | 9/2021 | Huber | |

FOREIGN PATENT DOCUMENTS

| | | | | |
|---|---|---|---|---|
| DE | 29514455 U1 | 12/1995 | | |
| DE | 29615659 U1 | 1/1998 | | |
| DE | 102022121453 A1 * | 3/2024 | ............. | B62K 21/20 |
| FR | 344045 A | 10/1904 | | |
| FR | 975513 A | 3/1951 | | |
| FR | 2932770 A1 | 12/2009 | | |
| GB | 2052677 A | 1/1981 | | |
| WO | WO9412381 A1 | 6/1994 | | |
| WO | WO9525034 A1 | 9/1995 | | |

OTHER PUBLICATIONS

"Leaf Spring," Wikipedia Page, date by Wayback Machine to Jun. 30, 2018, url:<https://web.archive.org/web/20180630232738/https://en.wikipedia.org/wiki/Leaf_spring#Characteristics>.

* cited by examiner

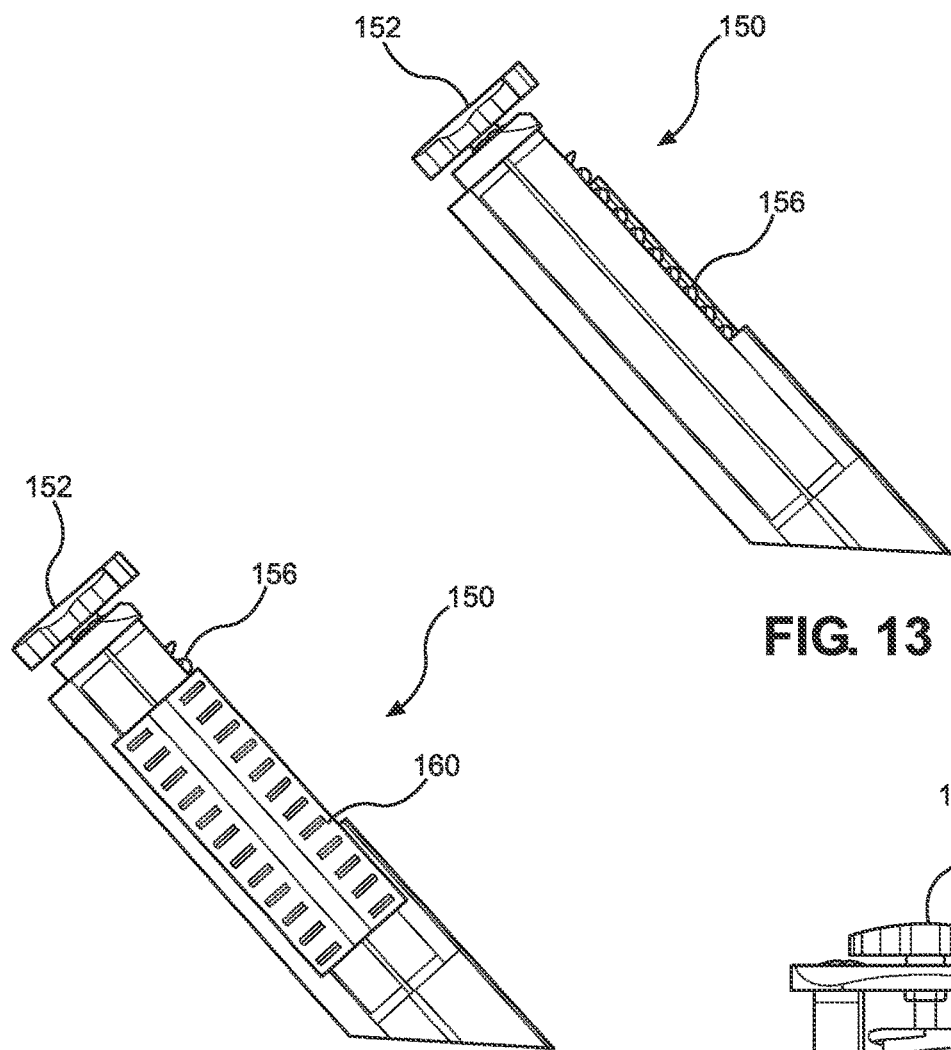
FIG. 13
FIG. 14
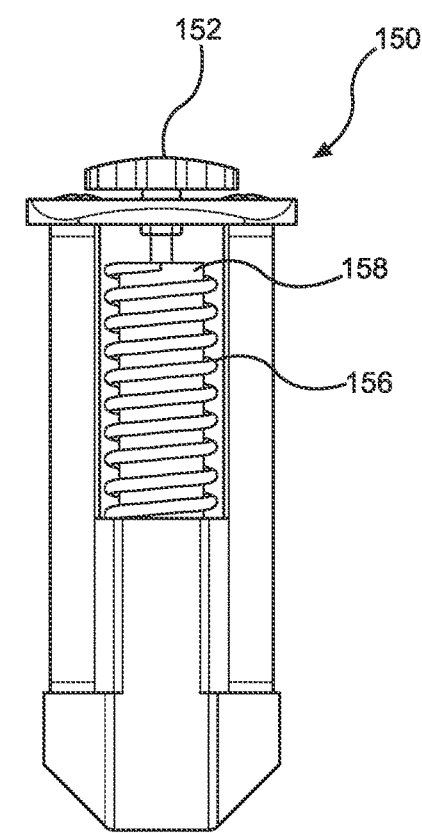
FIG. 15

SUSPENSION HANDLEBAR ASSEMBLY AND STEM FOR BICYCLE

RELATED APPLICATIONS

This application is a Continuation of U.S. Utility patent application Ser. No. 17/988,610 for a "Suspension handlebar assembly and stem for bicycle," filed on Nov. 16, 2022, which is a Continuation of U.S. Utility patent application Ser. No. 17/317,704 for a "Suspension handlebar assembly and stem for bicycle," filed on May 11, 2021, which is a Continuation in Part of U.S. Utility patent application Ser. No. 17/163,340 for a "Suspension handlebar assembly and stem for bicycle," filed on Jan. 29, 2021, which in turn claims the benefit of priority to the United States Provisional Patent Application for Ser. No. 62/967,534 for a "Suspension Handlebar Assembly And Stem For Bicycle," filed on Jan. 29, 2020. The above-mentioned applications are incorporated herein by this reference.

FIELD OF THE INVENTION

This invention relates to bicycle handlebars and stems, more specifically to bicycle stems designed to cushion road shock to the rider. More specifically, though not exclusively, the present invention relates to a suspension bicycle stem or suspension stem/handlebar unit with a sprung or sprung and damped 30-60 degree inclined linear sliding element.

BACKGROUND OF THE INVENTION

Bicycles were invented as early as 1885, and consisted at first of a crude implementation of steel wheels propelled by fixed pedals. In the over 150 years since its invention, bicycles have evolved into highly technical mechanical systems incorporating some of the most modern materials technologies, design elements, and creature comforts representative of the best that engineering has to offer. Despite these incredible enhancements in bicycle technology, and the keen focus on making the modern bicycle a highly engineered machine capable of surviving incredible physical stresses and prolonged use, the modern day bicycle still has a fundamental challenge. This challenge is not the bicycle itself, rather, the environment in which the bicycle operates.

Bicycles are operated on a variety of surfaces, ranging from finely paved road surfaces, to the most treacherous mountain environments. Across this spectrum of riding surfaces, there are a variety of surfaces that are encountered. For instance, on even the most pristine roadway, there is often a pothole, unmarked transition, or simply poor workmanship, that results in abrupt transitions, bumps, and jolts. Also, when riding in a mountain environment, there are ruts, gulleys, rocks, ridges, and jumps which result in the most challenging rides. Whether it is due to potholes, transitions, poor workmanship, ruts, gulleys, rocks, ridges or jumps, when a bicycle rider experiences these hazards, there is often an abrupt physical shock to the rider.

Many bicycle riders find the road shock transmitted to their hands, arm and bodies objectionable. In addition, this road shock slows the bicycle by upsetting forward momentum and generating resistance at the tire contact surface. The shock and discomfort are only exacerbated when riding long distances, or when the rider is caught unaware of the upcoming shock.

There have been quite a few suspension stems in bicycle history attempting to alleviate the shock and discomfort. Most of these suspension stems have been fitted into a handlebar stem and have used a pivot or multiple pivots. However, these prior stems can have awkward travel paths that only compromises a rider's balance and focus when encountering shock and discomfort, and because of the poor alignment and awkward positioning, these prior devices develop looseness and imbalance resulting in trouble controlling the bicycle.

In light of the above it would be advantageous to provide a device that allows even the most exhausted rider to avoid the pain, shock and discomfort of an abrupt event while riding. Further, it would be advantageous to provide a device that would be easily retrofitted to even the most ordinary bicycle to provide the rider with the ability to avoid the shock and discomfort, despite the exhaustion and fatigue that comes with distance rides, or rides in treacherous environments. Further, it would be advantageous to provide a device that is easily manufacturable, comparatively cost effective, and capable of providing a rider with a measure of protection from the unwanted shock and discomfort.

SUMMARY OF THE INVENTION

This bicycle handlebar stem or stem/handlebar assembly has an inclined linear travel approximately 45 degrees from horizontal. This inclined path mimics a rider's natural arm inclination and pitching moment. 45 degrees is nearly ideal for most dropped bar road bicycles but different style bicycles may have an ideal angle between 30 and 60 degrees.

This handlebar stem or stem/handlebar unit can be manufactured in aluminum, titanium, magnesium or carbon fiber. The inclined sliding element may move on linear roller bearings, ball bearings or specially compounded glide bushings. The sliding element may be sprung with a coil spring or a version of a "leaf" spring, flexible material or elastomers or a combination thereof. In the stem alone embodiment this invention will appear as a conventional stem split along its extension with an inclined linear ramp with guides that allow for precise steering.

In an integrated embodiment the ramp will be incorporated into the forward part of the "stem" with the slider as a part of or directly attached to the handlebar. This invention may be applied to any roadgoing, off road, "gravel" or hybrid bicycle. It provides increased comfort and performance in every application.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 13 is a side view of a ramp portion of a slider of a preferred embodiment of a suspension handlebar and stem for a bicycle;

FIG. 14 is a side view of the ramp with a bearing attached to facilitate movement of the slider;

FIG. 15 is a front view of the ramp;

DETAILED DESCRIPTION

Figure 1:
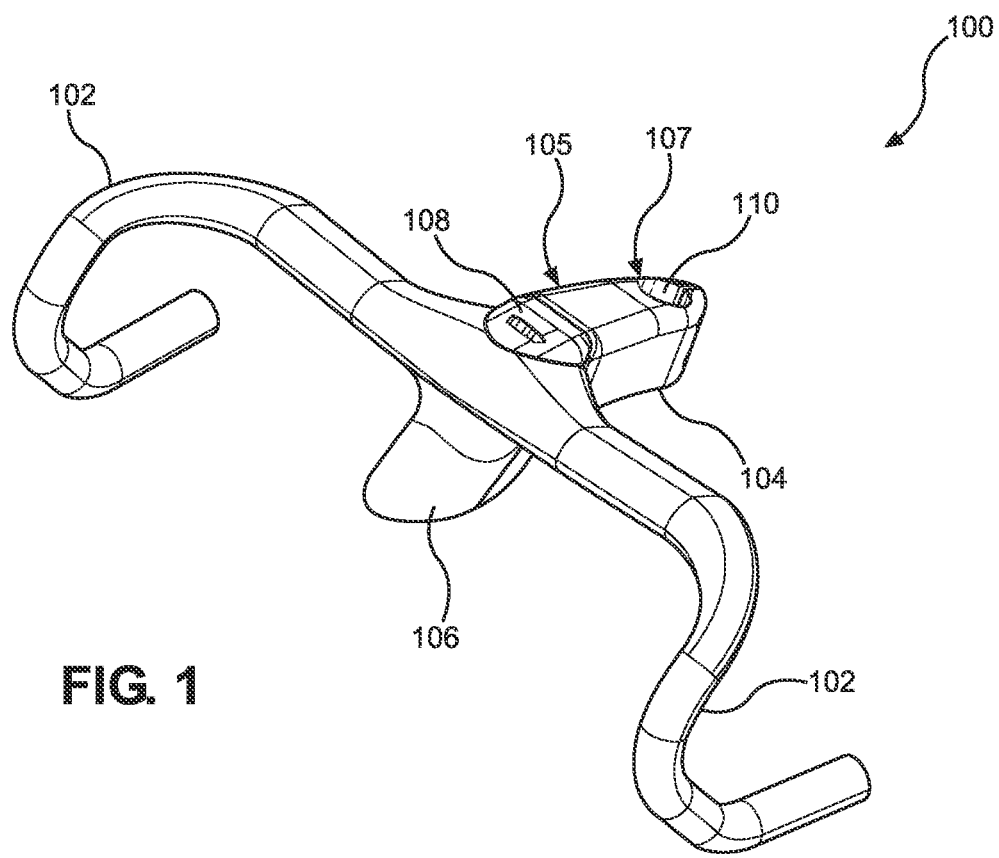
FIG. 1 is a front perspective view of a preferred embodiment of a suspension handlebar assembly and stem for a bicycle.

Referring initially to FIG. 1, a preferred embodiment of a suspension handlebar assembly and stem for a bicycle is illustrated and generally designated 100. Assembly 100 includes handlebars 102 joined to stem 104. Attached to the forward part 105 of stem 104, proximate the location where stem 104 joins to handlebars 102, is an inclined slider 106 that extends from under cover 108 at the top of stem 104 to below stem 104. The rear of stem 104 has a connector, illustrated herein as fork clamp 110, to attach assembly 100 to a bicycle steering tube (not shown). Some preferred embodiments use fork clamp 110, while alternate preferred embodiments have a quill or threaded member (not shown) as the connector to attach to the steerer tube of a bicycle.

FIG. 1 and the following figures illustrate an integrated embodiment in which the slider 106 is incorporated into the handlebars 102 and stem 104 as an integral portion of assembly 100. Some other embodiments include a stem 104 with a slider 150 (shown in FIG. 13), in which stem 104 is designed to be attached to a separate, standard bicycle handlebar.

Figure 2:
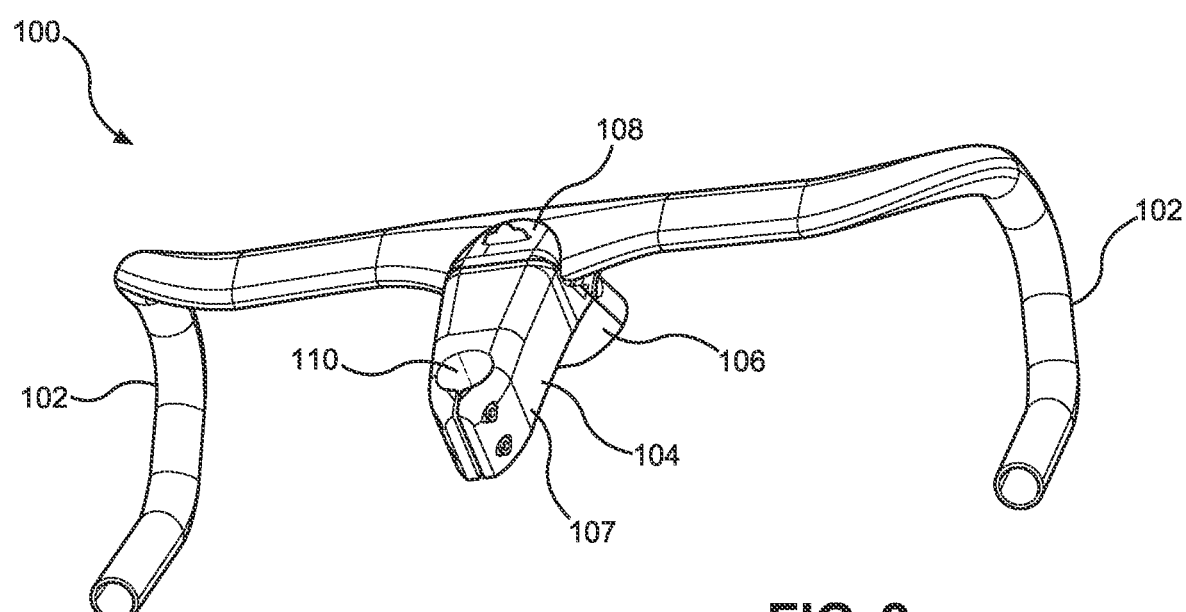
FIG. 2 is a rear perspective view thereof.

Referring now to FIG. 2, a rear perspective view of assembly 100 is shown, further illustrating the positions of slider 106 and cover 108 relative to handlebars 102 and stem 104 in a preferred embodiment. Slider 106 is angled to be at or about forty-five (45) degrees from horizontal along the axis defined by the direction of travel when assembly 100 is attached to a bicycle; the angle is approximately the same angle as a rider's forearms, allowing slider 106 (see FIG. 13) to absorb energy from impacts that would otherwise be transferred to the rider's hands, arms, and body.

Figure 3:
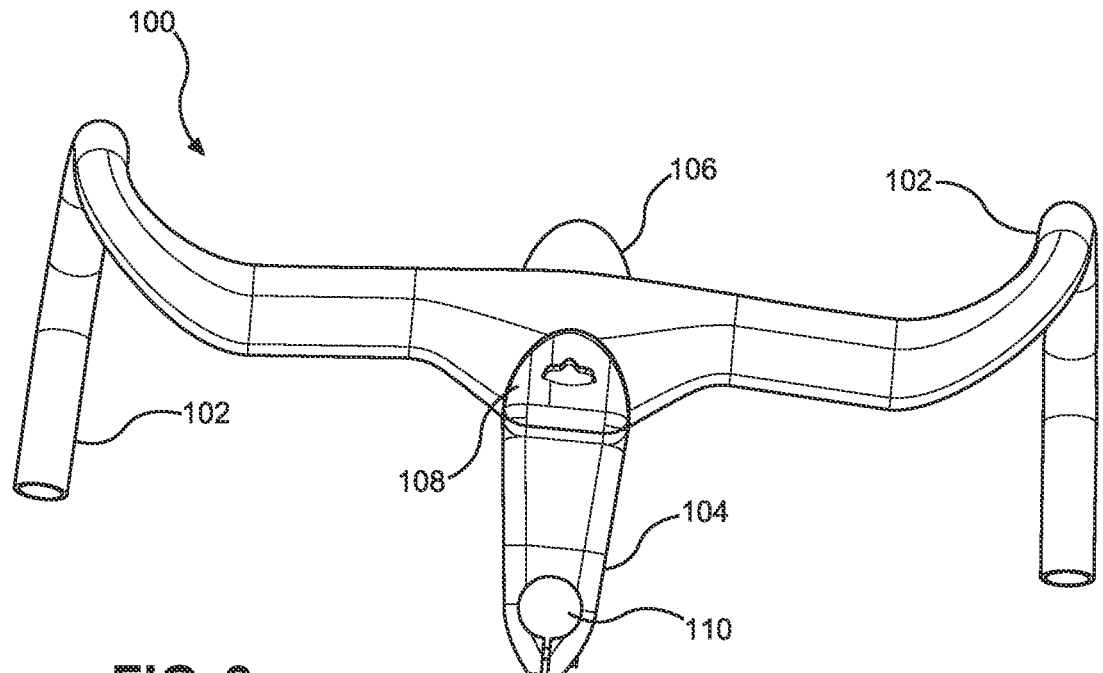
FIG. 3 is top view thereof.

Referring now to FIG. 3, a top view of assembly 100 is shown, further illustrating the relative positions of slider 106, handlebars 102, cover 108, and stem 104.

Figure 4:
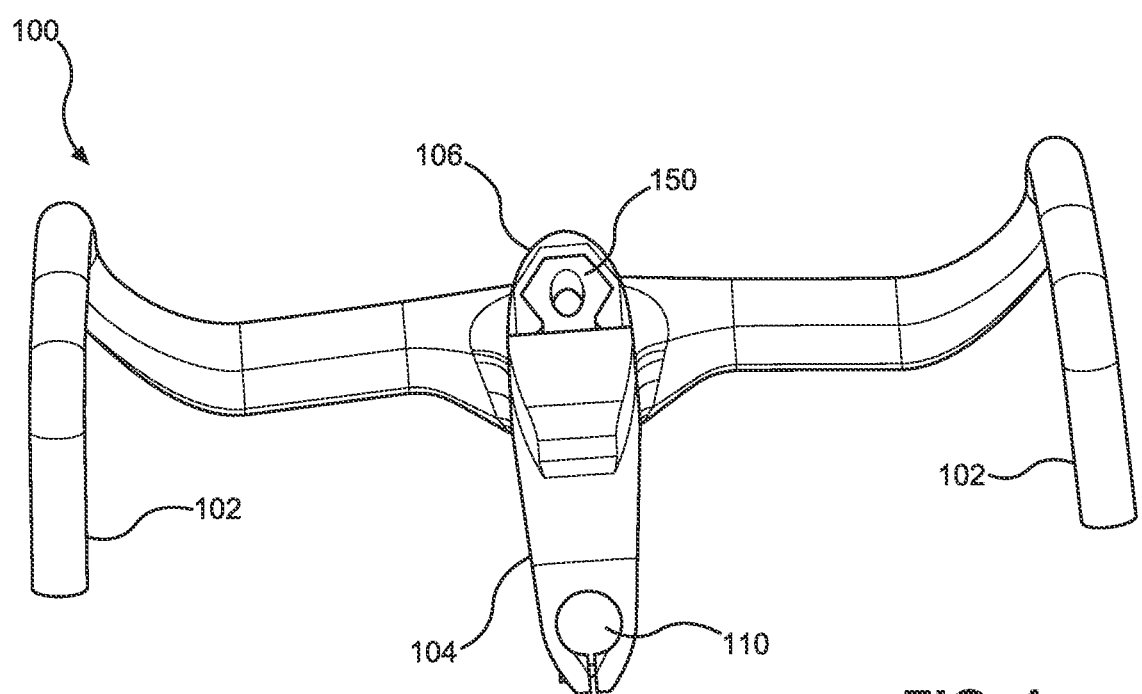
FIG. 4 is a bottom view thereof.

Referring now to FIG. 4, a bottom view of assembly 100 is shown. From the bottom of assembly 100, a ramp 150 on stem 104 and inside slider 106 is visible. Ramp 150 movably engages slider 106 allowing movement of slider 106 on ramp 150 along the forty-five (45) degree angle from horizontal.

Figure 5:
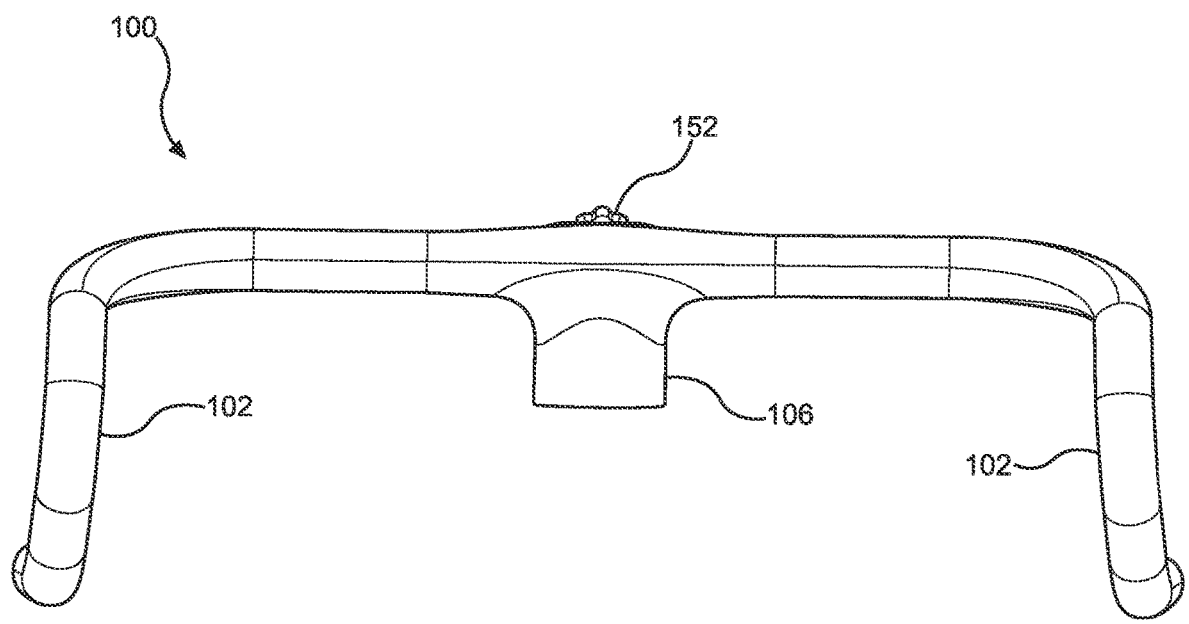
FIG. 5 is a front view thereof.

Referring now to FIG. 5, a front view of assembly 100 is shown, illustrating the location of slider 106 extending downward from the point where handlebars 102 and stem 104 are joined. In a preferred embodiment, slider 106 is integral with handlebars 102. In some other embodiments, slider 106 is part of a separate stem 104.

Figure 6:
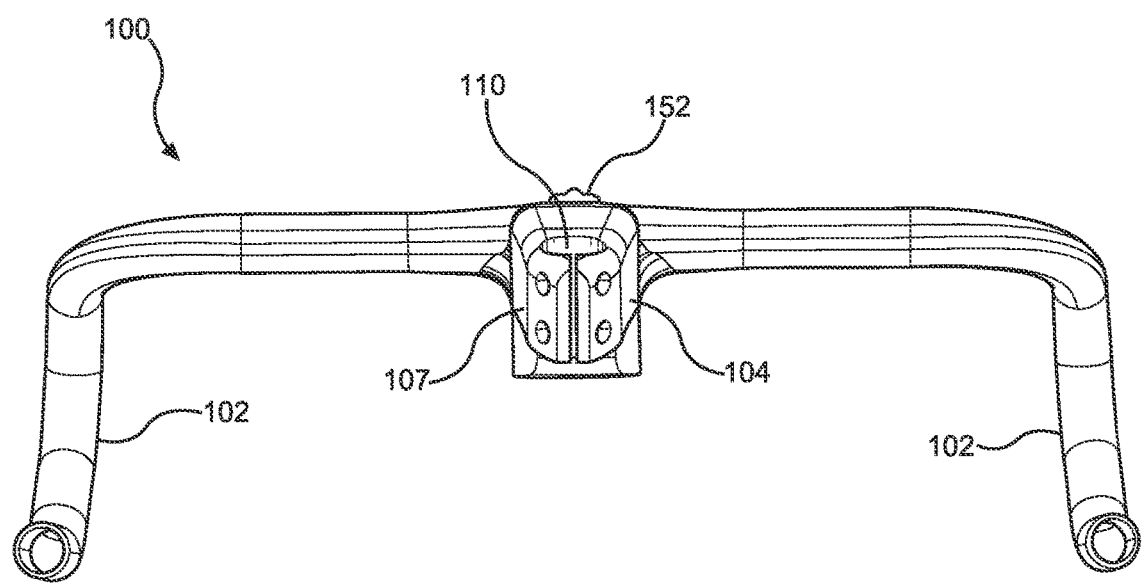
FIG. 6 is a rear view thereof.

Referring now to FIG. 6, a rear view of assembly 100 is shown, illustrating stem 104 joined to handlebars 102, and stem clamp 110 at the opposite end, or rear portion 107, of stem 104 from the point where handlebars 102 join to stem 104.

Figure 7:
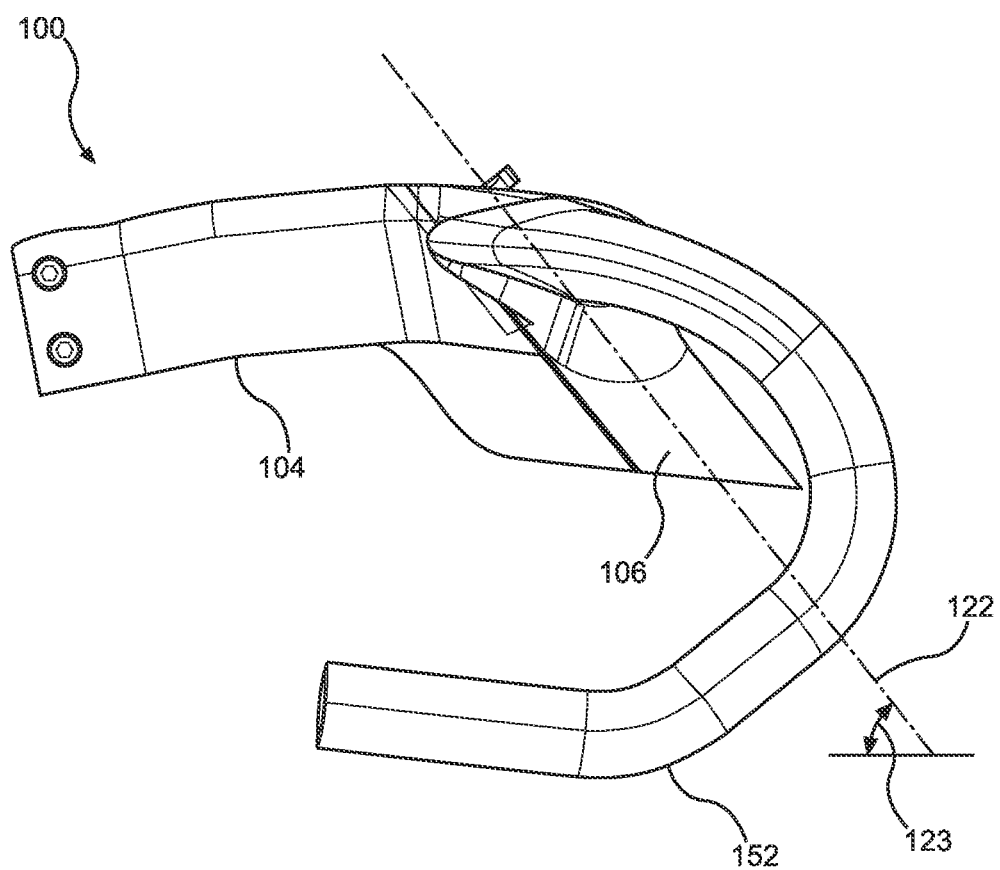
FIG. 7 illustrates the axis of the slider of a preferred embodiment of a suspension handlebar assembly and stem for a bicycle.

Referring now to FIG. 7, a side view of assembly 100 is shown, illustrating the axis 122 of motion of the slider 106. In a preferred embodiment, axis 122 is at a forty-five (45) degree angle 123 from the ground, approximating the angle of a rider's arms while riding the bicycle. It is to be appreciated that other angles 123 can be used to accommodate riders with different physical measurements and bicycle frames with different proportions.

Figure 8:
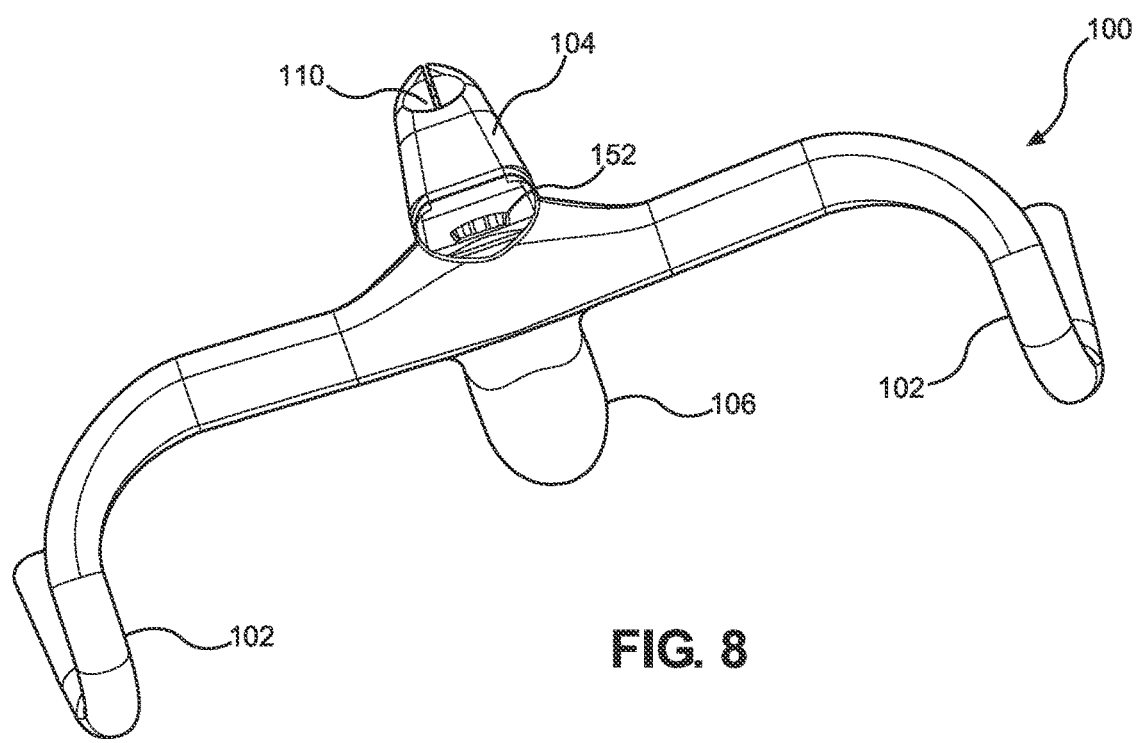
FIG. 8 illustrates a preferred embodiment of a suspension handlebar assembly and stem for a bicycle with a cover removed to show the top of a ramp against which the slider moves.
Figure 10:
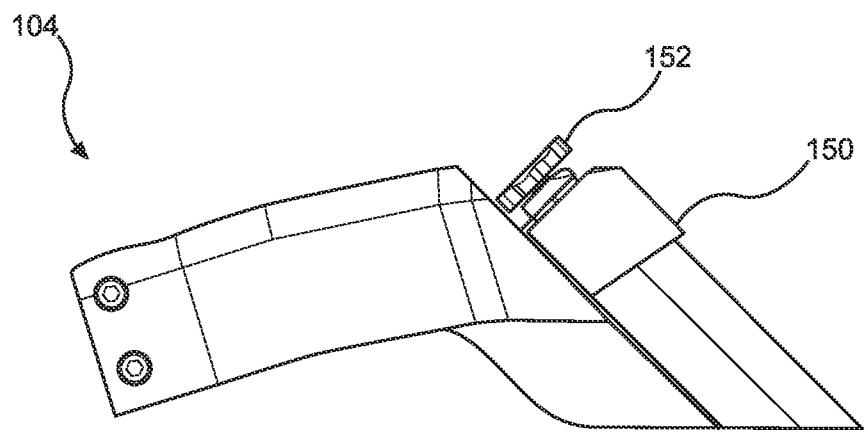
FIG. 10 is a side view of a stem, slider and compression dial of a preferred embodiment of a suspension handlebar and stem for a bicycle.

Referring now to FIG. 8, slider 106 moves against a ramp 150 (shown in FIG. 10). Preferred embodiments of ramp 150 include a spring 156 (shown in FIG. 15) and a damper 158

(shown in FIG. 15) in order to better absorb the impact of jolts while riding over imperfections in the road or other terrain. With cover 108 removed, compression dial 152, which allows a rider to adjust the compression or stiffness of damper 158, is visible, and can be rotated to compress or release spring 156 to adjust the stiffness of the damper 158.

Figure 9:
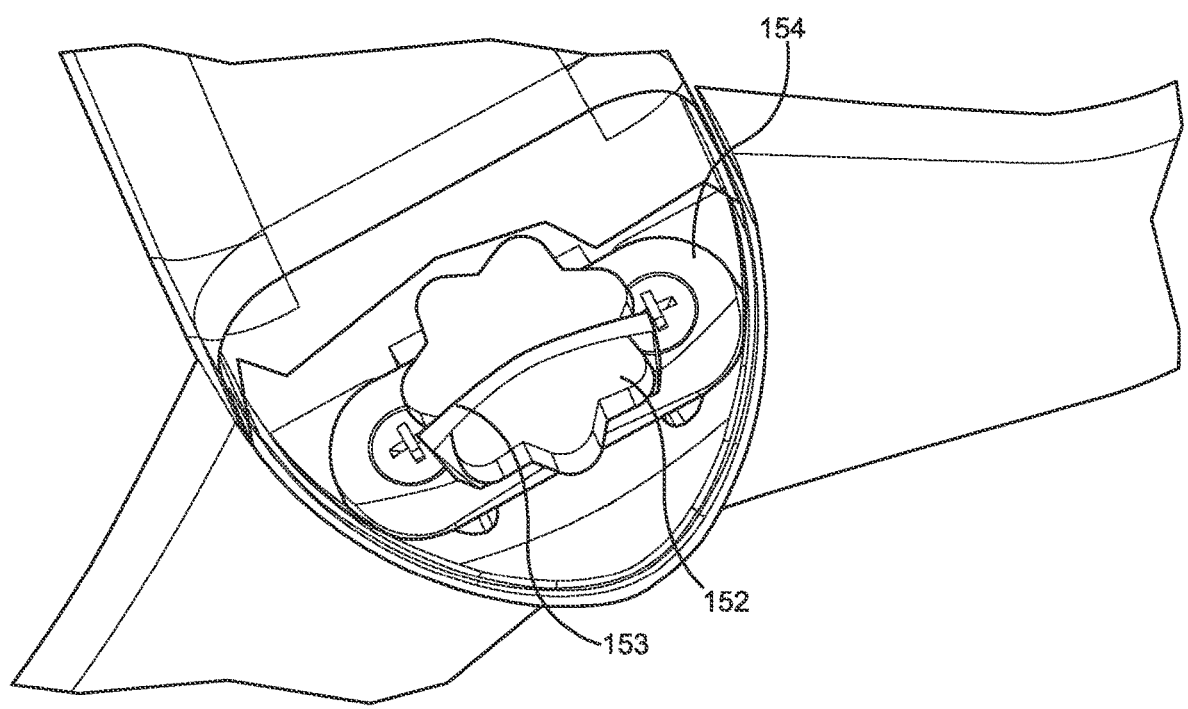
FIG. 9 illustrates a compression dial at the top of a slider of a preferred embodiment of a suspension handlebar assembly and stem for a bicycle.

Referring now to FIG. 9, a closer view of dial 152 and mounting hardware 154 for spring 156 (shown in FIG. 15) and damper 158 (shown in FIG. 15) is illustrated. A restraint strap 153 may be provided to secure dial 152 in position once adjusted to avoid changes in stiffness or damper 158 during use.

Figure 11:
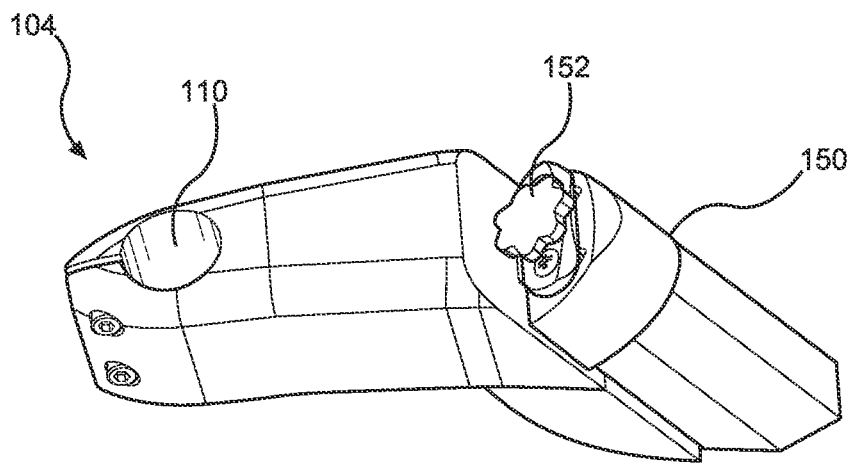
FIG. 11 is a top perspective view thereof showing the compression dial.
Figure 12:
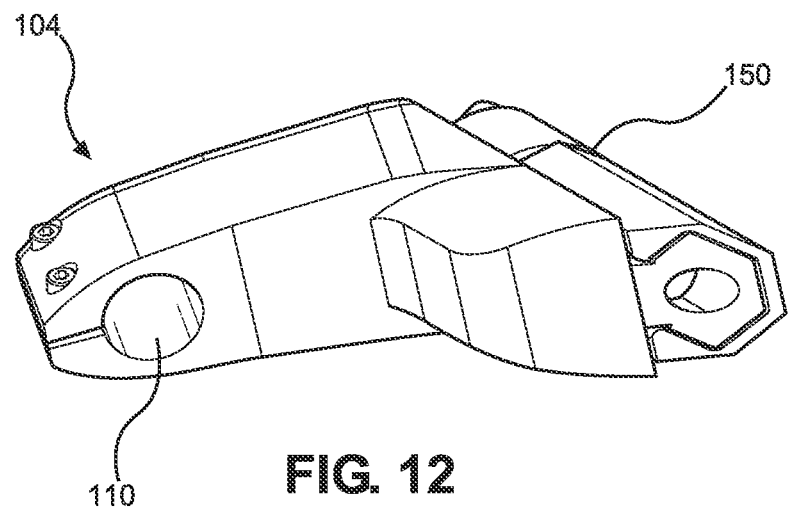
FIG. 12 is a bottom perspective view thereof.

Referring now to FIG. 10, a side view of a preferred embodiment of stem 104 is shown, in which ramp 150 forms an integral part of stem 104. Ramp 150 is shaped to movably engage slider 106 on handlebars 102, thus allowing for the absorption of impact forces along axis 122 (shown in FIG. 7). FIG. 11 shows a top perspective view of the same embodiment of stem 104, while FIG. 12 shows a bottom perspective view thereof. From FIG. 12, the general hexagonal cross-sectional shape of ramp 150 is shown. Other shapes can be used without departing from the present invention, the hexagonal provides for longitudinal movement along ramp 150 while minimizing rotation to provide a tighter steering and increased level of control of the front wheel during use.

Referring now to FIG. 13, ramp 150 is shown with spring 156 inserted and dial 152 for adjusting the compression of damper 158 (shown in FIG. 15).

As illustrated in FIG. 14, in preferred embodiments, a bearing 160 is located on ramp 150 to facilitate movement between ramp 150 and slider 106. Bearing 160 is illustrated as an L-shaped, dual-row, linear roller bearing, but it will be apparent to one of ordinary skill in the art that other bearings will also be appropriate according to the embodiment, such as including Delrin or other known polymers.

Figure 16:
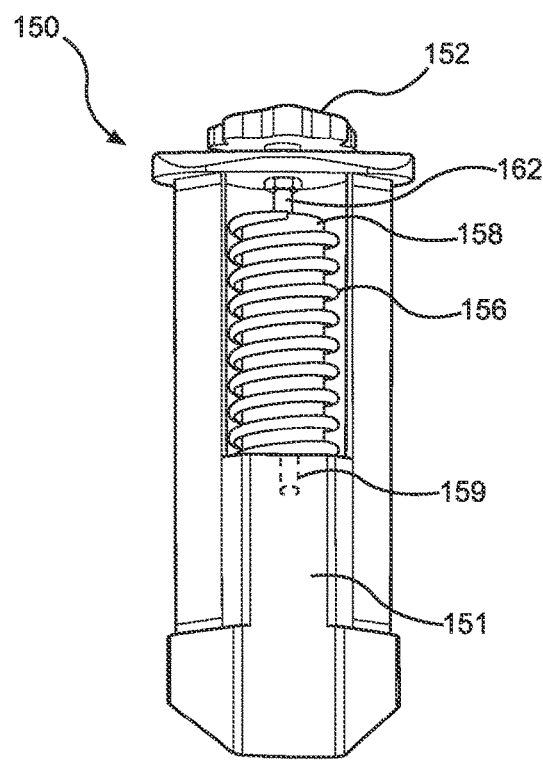
FIG. 16 is a perspective view thereof illustrating the connection of the damper to the compression control.

Referring now to FIG. 15, a front view of ramp 150 shows the location of spring 156 and damper 158 inside ramp 150. FIG. 16 illustrates the connection of dial 152 to damper 158 via compression adjustment shaft 162 which threads into a receiver 159 in lower portion 151 of ramp 150.

Figure 17:
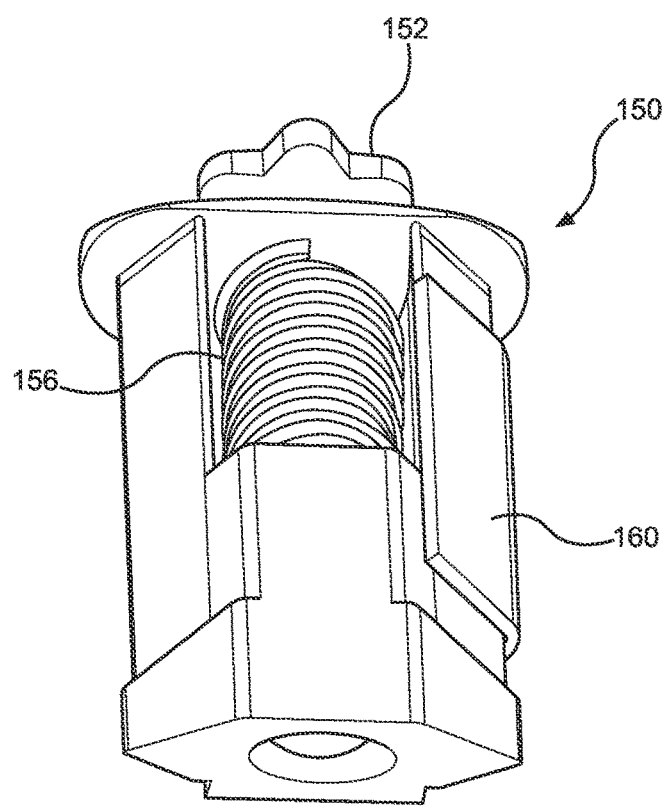
FIG. 17 is a bottom perspective view thereof illustrating placement of a bearing and compression spring and compression dial.
Figure 18:
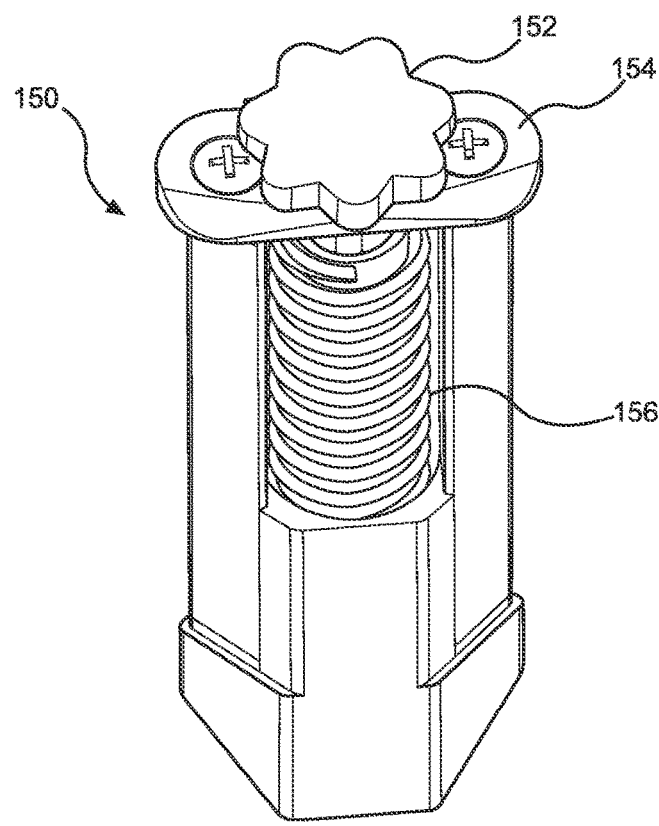
FIG. 18 is a top perspective view thereof.
Figure 19:
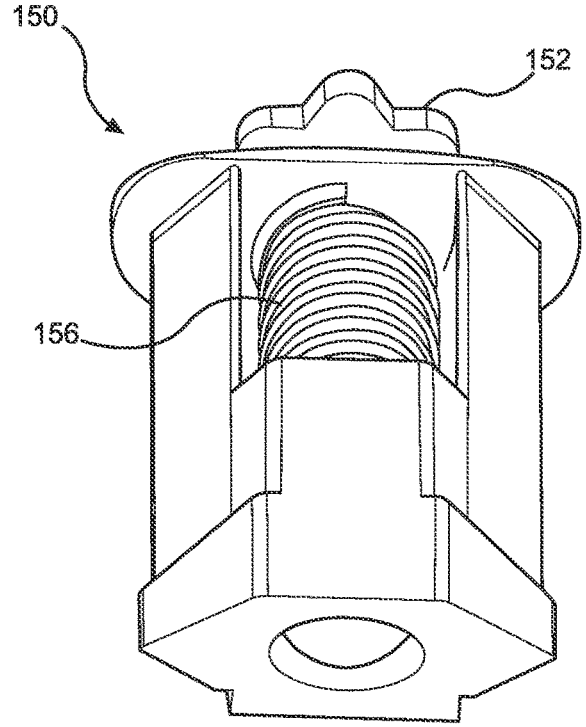
FIG. 19 is a bottom perspective view thereof.

FIG. 17 shows a bottom perspective view of a preferred embodiment of ramp 150 with a bearing 160 on one side; for illustrative purposes, the other bearing 160 is not shown on the other side with roller bearings omitted for clarify and indicating a solid bearing surface such as a polymer or other solid durable low friction bearing surface. FIG. 18 shows a top perspective view of ramp 150 without bearings 160 for illustrative purposes, and FIG. 19 shows a bottom perspective view of ramp 150 without bearings 160 for illustrative purposes.

Figure 20:
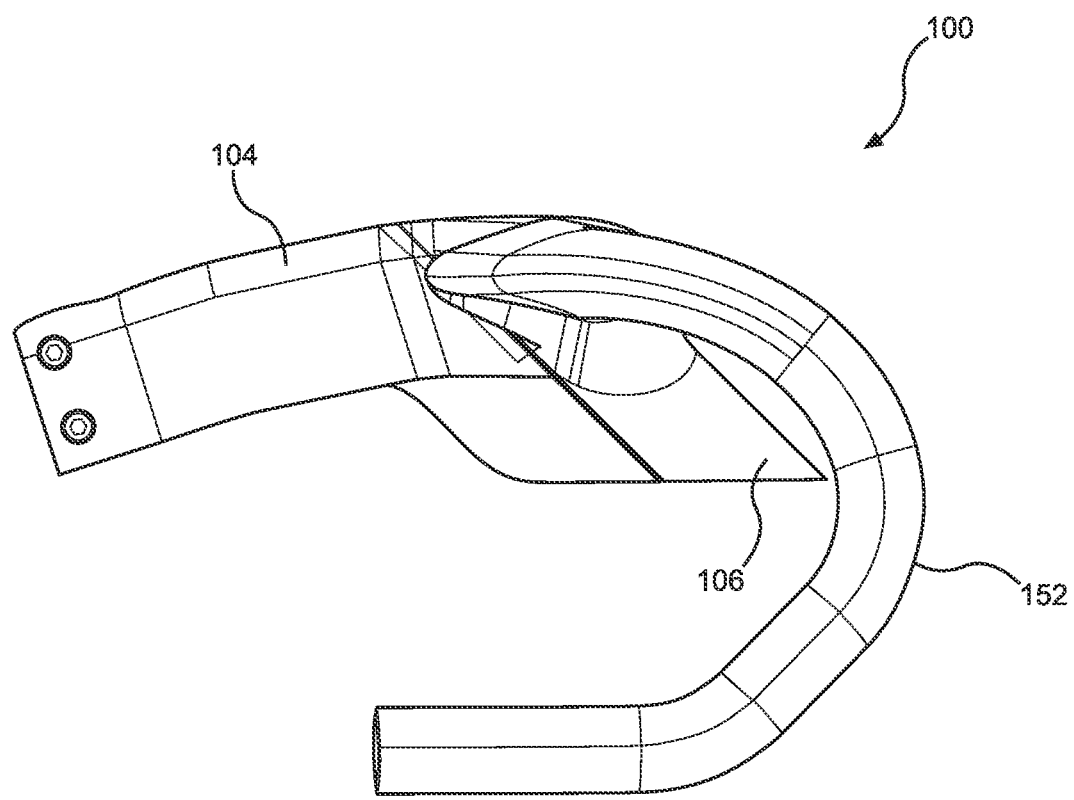
FIG. 20 is a side view of a preferred embodiment of a suspension handlebar assembly and stem for a bicycle.

Referring now to FIG. 20, a side view of assembly 100 is illustrated. When fully assembled, ramp 150 with bearings 160, spring 156, and, in some preferred embodiments, damper 158 (see FIGS. 15-19), is engaged to slider 106 such that it is located inside slider 106 and covered with cover 108.

Figure 21:
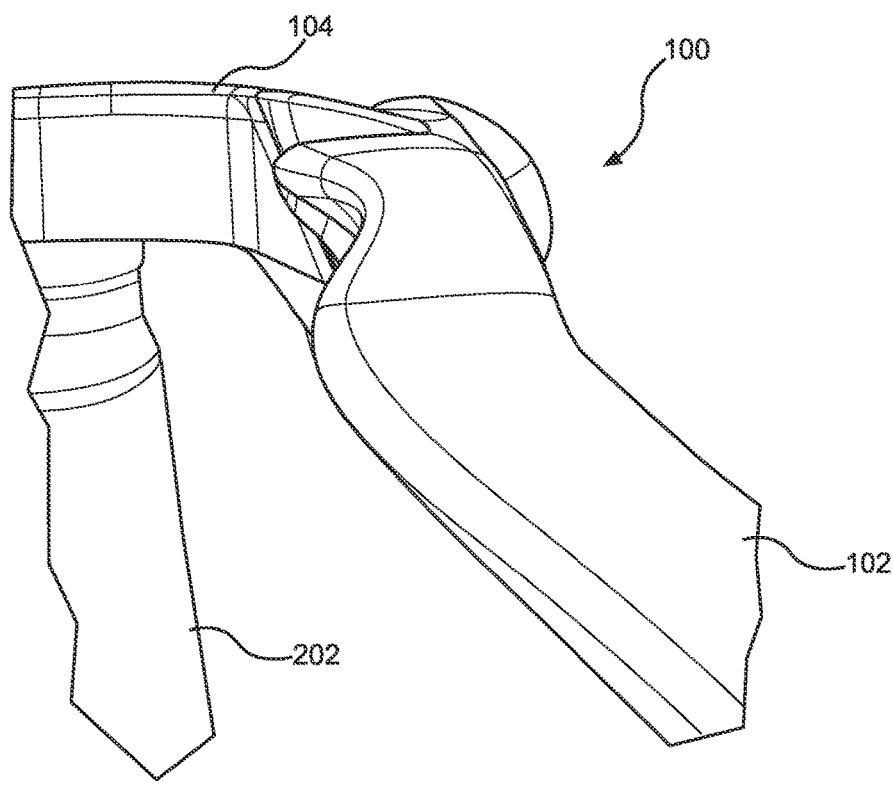
FIG. 21 is a perspective view of a preferred embodiment of a suspension handlebar assembly and stem for a bicycle showing the assembly connected to a bicycle fork.

Referring now to FIG. 21, assembly 100 is shown connected to a bicycle fork 202. In preferred embodiments, fork clamp 110 allows stem 104 in particular, and assembly 100 generally, to connect to steerer of a fork 202 of a standard bicycle. Embodiments with various sizes of fork clamp 110 allow for use with bicycles having steerer tubes of corresponding sizes.

Figure 22:
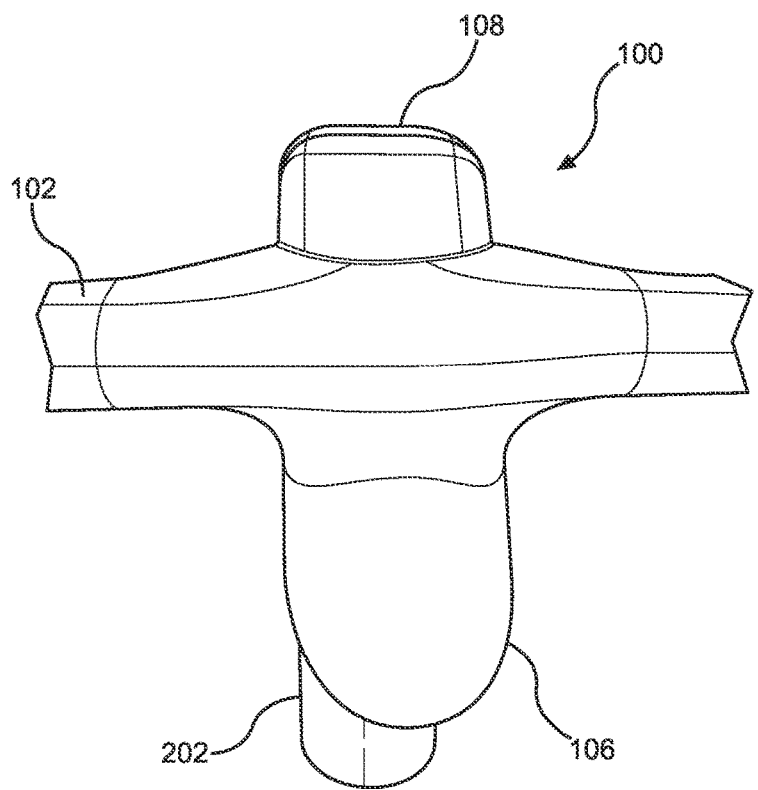
FIG. 22 is a front view thereof.

FIG. 22 shows a front view of assembly 100 connected to a bicycle fork 202, illustrating the position of slider 106 extending below handlebars 102 and in front of fork 202 when assembly 100 is used with a bicycle.

Figure 23:
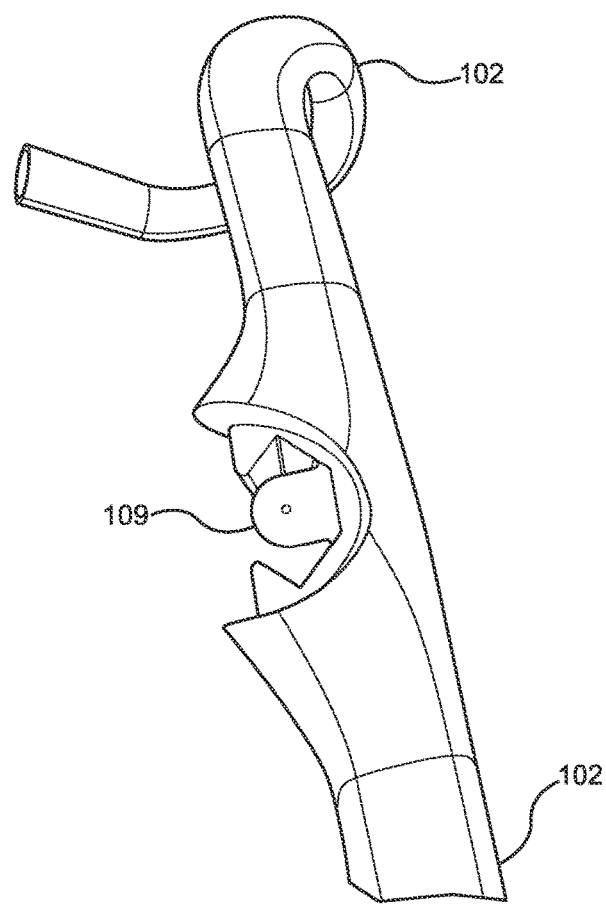
FIG. 23 is a top perspective view of a handlebar and slider of a preferred embodiment of a suspension handlebar assembly and stem for a bicycle.
Figure 24:
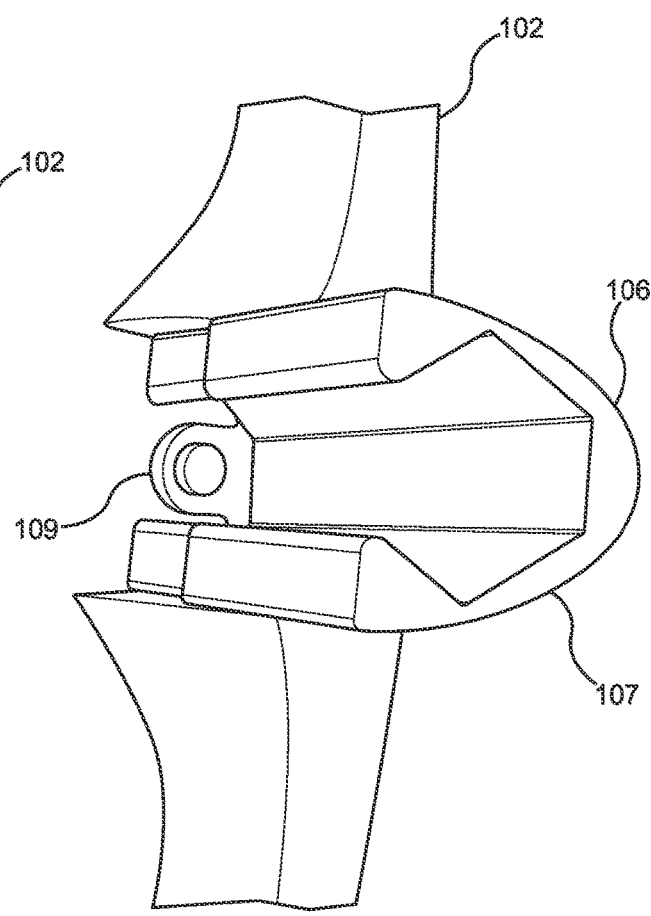
FIG. 24 is a bottom perspective view thereof.

FIGS. 23 and 24 illustrate handlebars 102 of a preferred embodiment of assembly 100, in which slider 106 is integral to handlebars 102 and formed with a hexagonal channel 107, allowing handlebars 102 to connect to a corresponding stem 104 by the sliding engagement of slider 106 of handlebars 102 over ramp 150 of stem 104. The bearing (not shown here) ensures a close tolerance and minimal gap between channel 107 and ramp 150, while still allowing the near frictionless movement therebetween. While tab 109 contacts the top of spring 156 so that the weight, and occasional jolt, is absorbed by spring 156 and not transmitted to the rider through handlebar 102.

Figure 25:
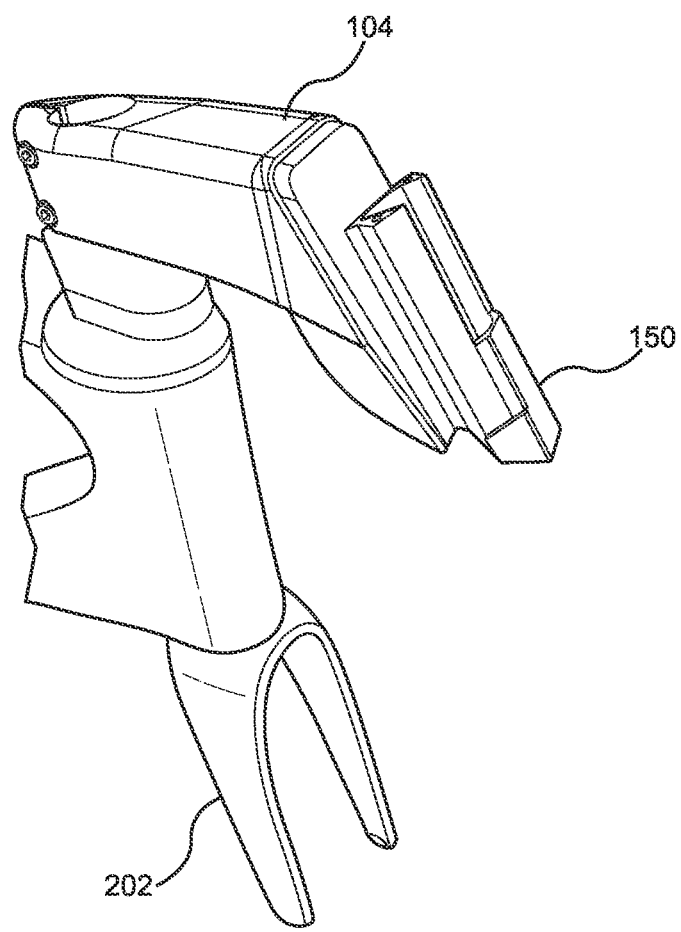
FIG. 25 is a top perspective view of a stem of a preferred embodiment of a suspension handlebar assembly and stem for a bicycle, showing the stem with ramp, in which the stem is connected to a bicycle fork.

FIG. 25 illustrates stem 104 of a preferred embodiment of assembly 100, with ramp 150 integral to stem 104, allowing stem 104 to connect to a corresponding handlebars 102 component by engagement of ramp 150 of stem 104 to slider 106 of handlebars 102.

Figure 26:
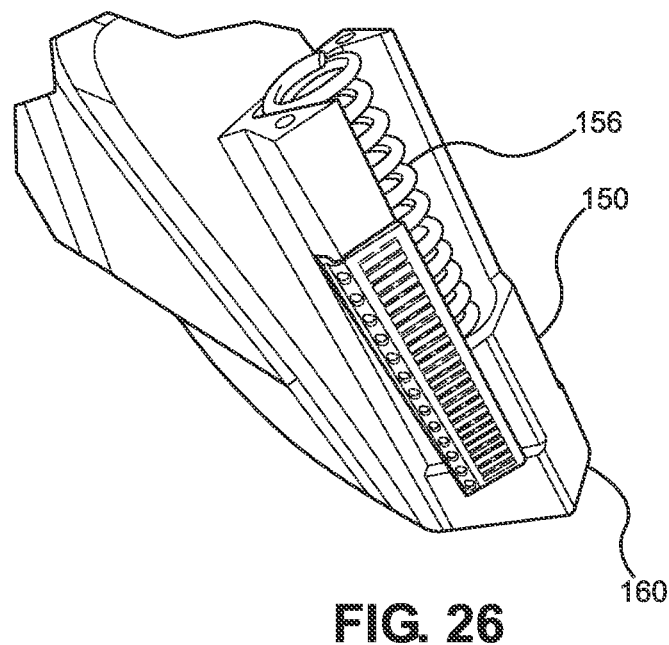
FIG. 26 is another top perspective view thereof illustrating the placement of a spring and slider on the ramp.

FIG. 26 illustrates ramp 150 of a preferred embodiment of assembly 100 with spring 150 located in ramp 150 and bearings 160 placed on ramp 150 to facilitate movement in direction 122 between ramp 150 and a corresponding slider 106.

Figure 27:
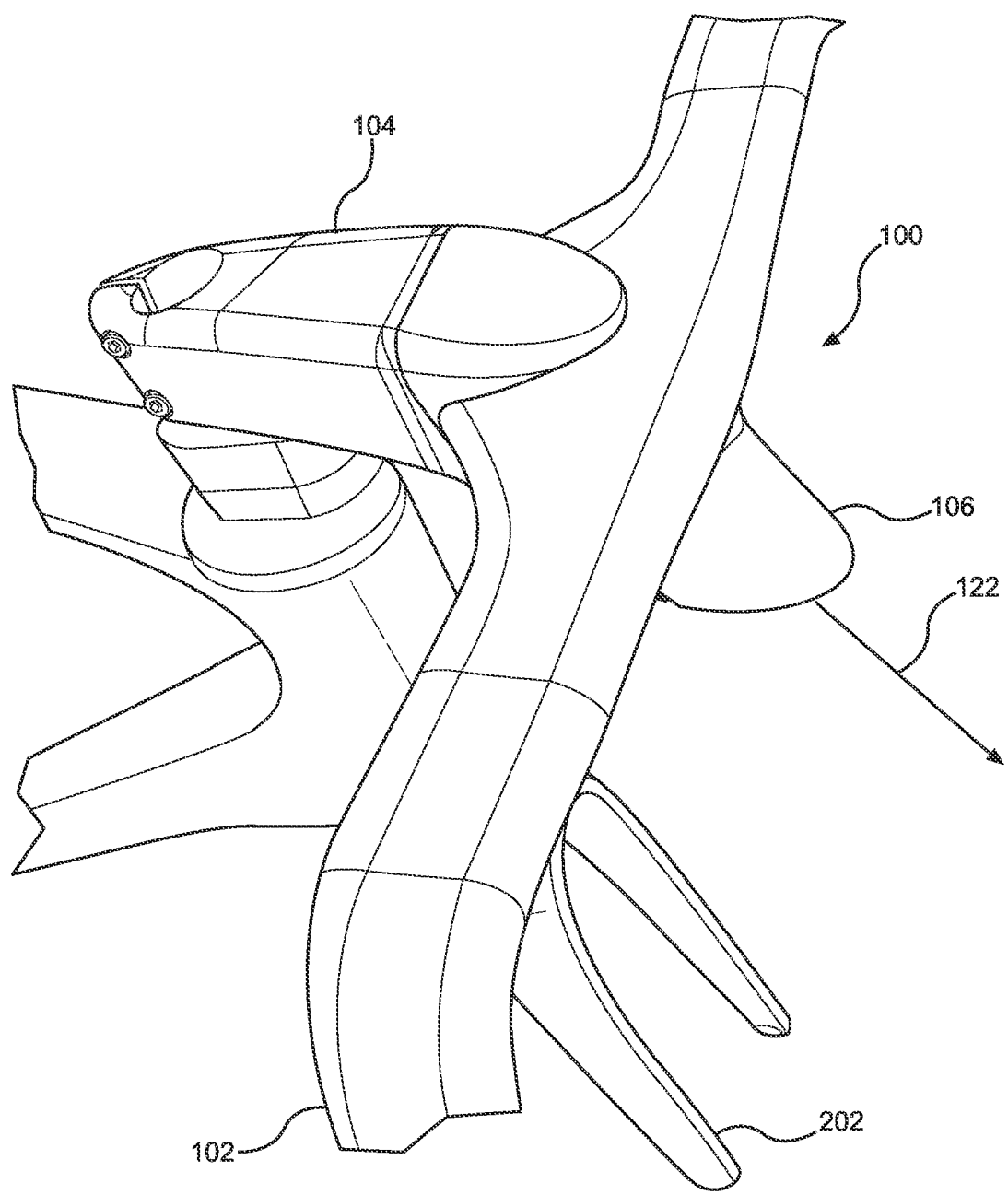
FIG. 27 is a top perspective view of a preferred embodiment of a suspension handlebar assembly and stem for a bicycle, showing the assembly connected to a bicycle fork.

Referring now to FIG. 27, a preferred embodiment of assembly 100 is shown connected to a bicycle fork 202, thus illustrating the configuration of assembly 100 when in use, with stem 104 connecting handlebars 102 and slider 106 to the rest of the bicycle.

Figure 28:
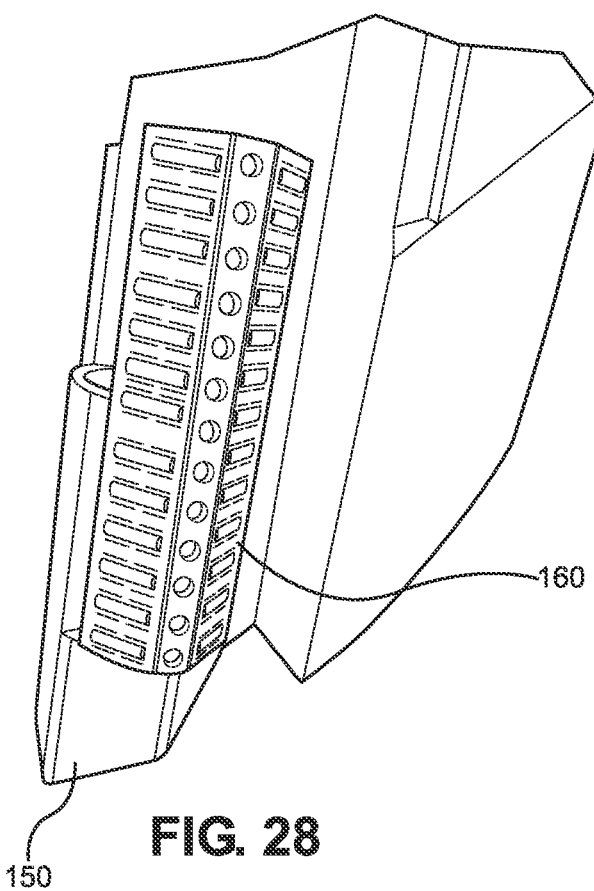
FIG. 28 is a side view of a ramp of a stem of a preferred embodiment of a suspension handlebar assembly and stem for a bicycle, showing an L-shaped bearing attached to a side of the ramp.
Figure 29:
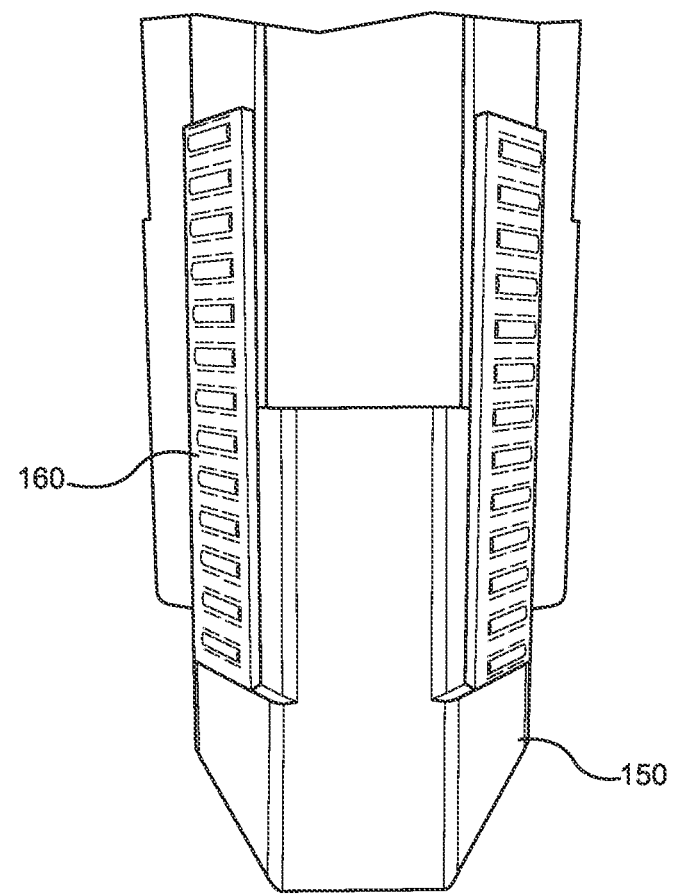
FIG. 29 is a front view thereof, showing an L-shaped bearing on each of both sides of the ramp.
Figure 30:
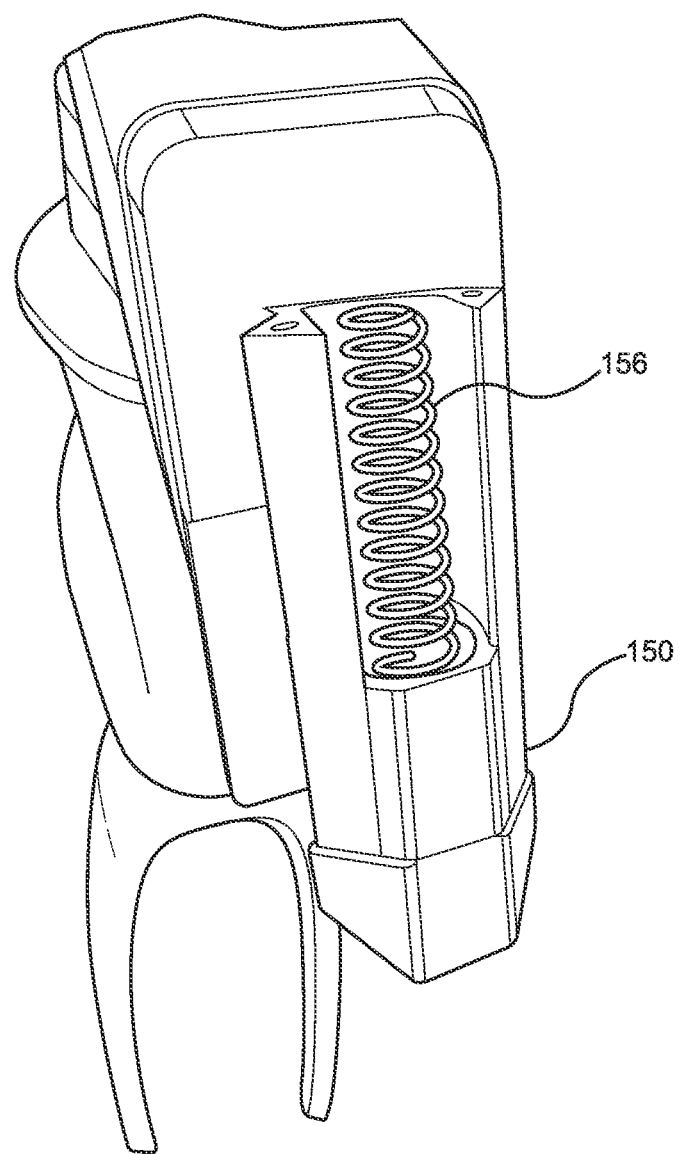
FIG. 30 is a top front perspective view thereof, showing the placement of a compression spring in the ramp.

FIGS. 28 and 29 illustrate a preferred embodiment and configuration of ramp 150 with a bearing 160 on the left side of ramp 150 and another bearing 160 on the right side of ramp 150. FIG. 30 illustrates the ramp 150 with a spring 156 located inside.

Figure 31:
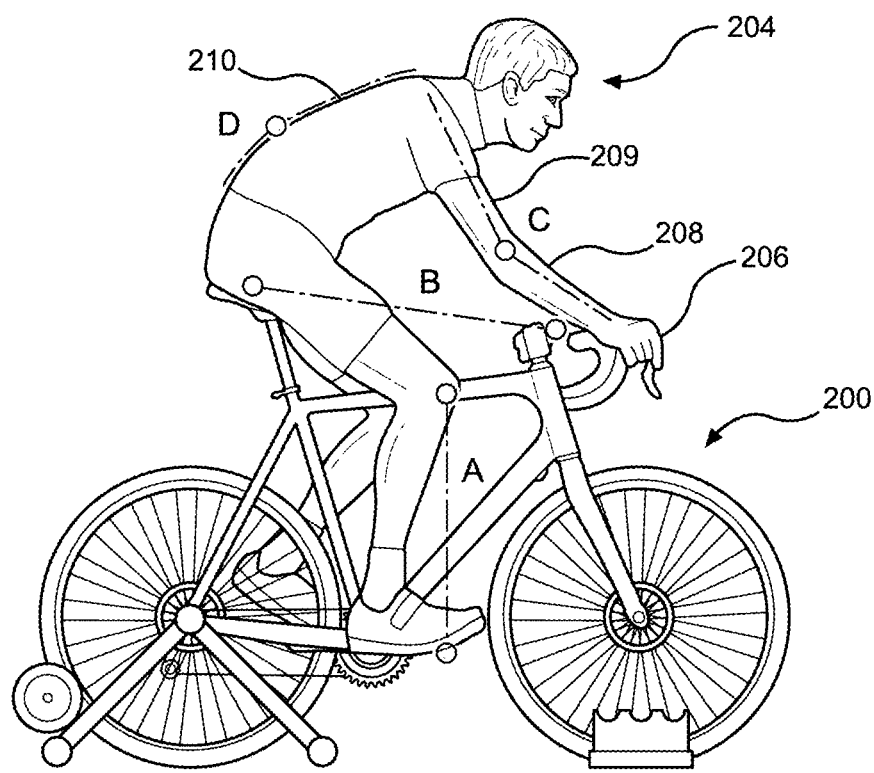
FIG. 31 is a side view of a rider on a bicycle, illustration the position of the body during riding.
Figure 32:
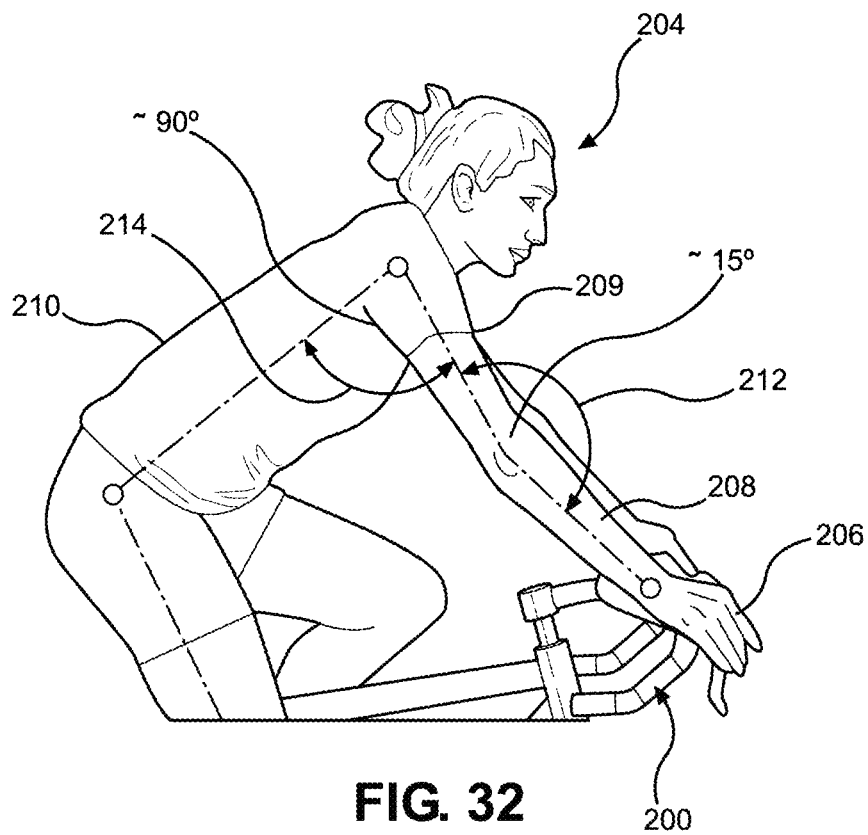
FIG. 32 is a side view of a rider on a bicycle, illustrating the position and angle of the arms during riding.

Referring now to FIG. 31, a bicycle 200 is shown in use by a rider 204, illustrating the relative position of a rider's 204 hands 206, forearms 208, upper arms 209 and torso 210 while riding. As illustrated in FIG. 32, rider 204 has forearms 208 at angle 212 of approximately fifteen (15) degrees from straight (175 degrees) upper arms 209, while upper arms 109 are at angle 214 of approximately ninety (90) degrees from torso 210.

Figure 33:
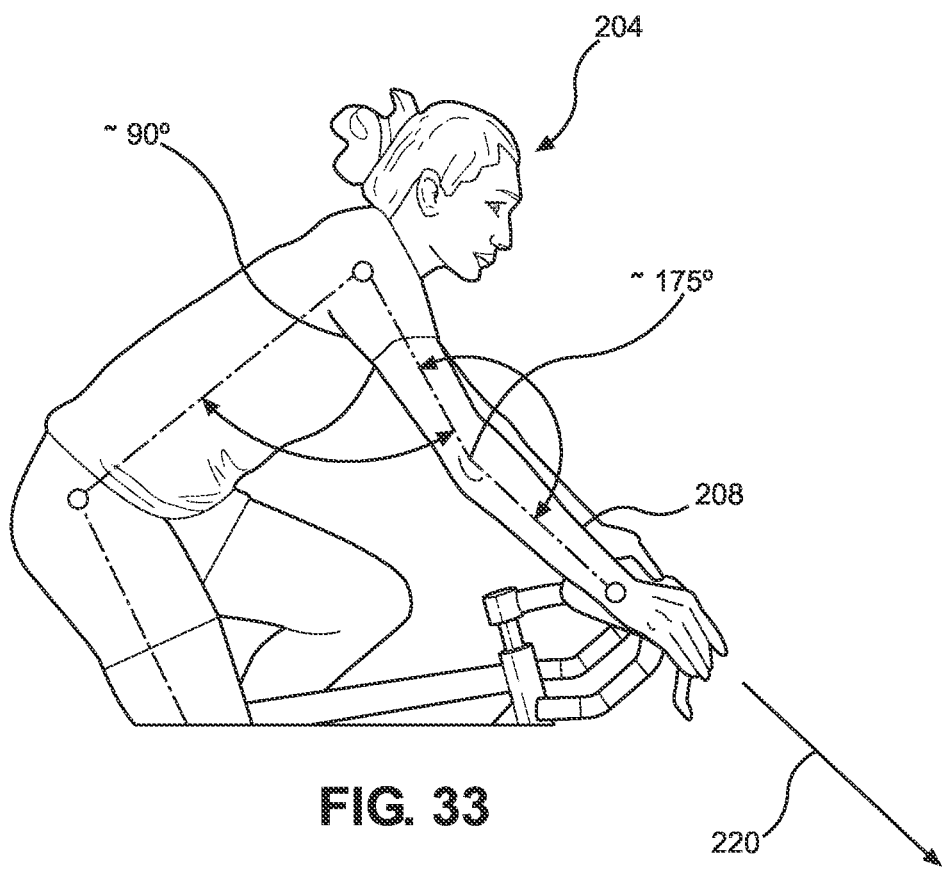
FIG. 33 is a side view of a rider on a bicycle, illustrating the direction of impact for a bicycle rider that encounters an abrupt jolt.
Figure 34:
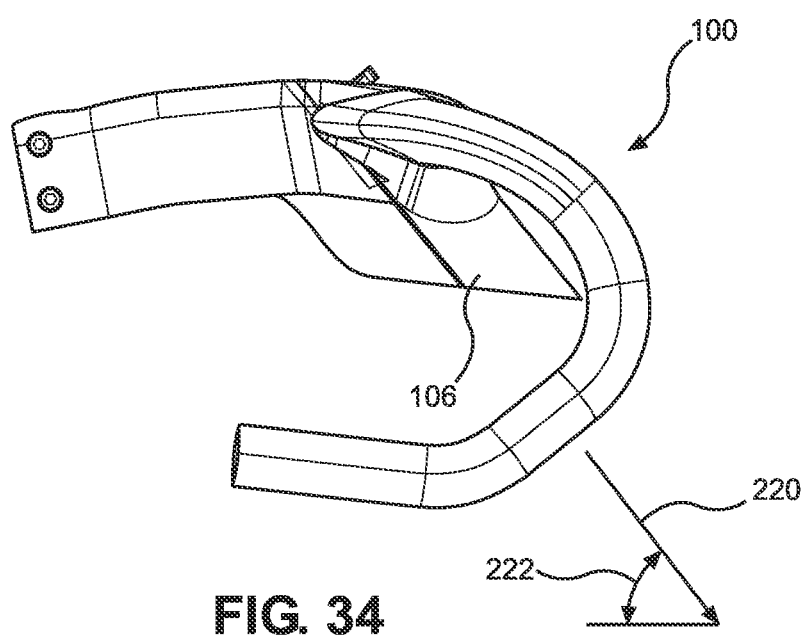
FIG. 34 is a side view of a preferred embodiment of a suspension handlebar assembly and stem for a bicycle, illustrating the linear travel intended to absorb the linear impact thereby preventing the rider from full exposure of the jolt.

Referring now to FIGS. 33 and 34, the direction 220 of impact for a bicycle rider that encounters an abrupt jolt is shown. Impact 220, or at least the portion of the force of impact 220 that affects the forearms 208 of rider 204, occurs at angle 222 of approximately forty-five (45) degrees from the ground, the same as the angle of axis 122 (see FIG. 7) of movement of slider 106, thus enabling slider 106, in conjunction with ramp 150, to absorb the impact, thereby preventing the rider from full exposure of the jolt.

While there have been shown what are presently considered to be preferred embodiments of the present invention, it will be apparent to those skilled in the art that various changes and modifications can be made herein without departing from the scope and spirit of the invention.

What is claimed is:
1. A suspension handlebar assembly, comprising:
a handlebar;
a slider centered along the handlebar and extending below the handlebar;
a stem having an upper surface, a first end, and a second end;
a ramp at the first end of the stem below the upper surface and extending below the stem; and
a connector at the second end of the stem, wherein the ramp is configured to engage the slider allowing for slideable movement between the ramp and the slider, wherein a spring is located in the ramp and configured to provide resistance to movement between the ramp and the slider to absorb impact energy;

a damper to dissipate energy stored in the spring;

a dial configured to adjust compression of the damper, the dial located at the top of the ramp; and an aperture located at a junction of the handlebar and the stem, the aperture configured to allow access to the dial.

2. The suspension handlebar assembly of claim 1, further comprising at least one bearing located between the ramp and the slider to facilitate the movement between the ramp and the slider.

3. The suspension handlebar assembly of claim 2, wherein the at least one bearing comprises roller bearings.

4. The suspension handlebar assembly of claim 1, wherein said ramp has a hexagonal cross-section.

5. The suspension handlebar assembly of claim 4, wherein said slider has a hexagonal cross-section that is larger than said hexagonal cross-section of said ramp wherein said slider is slidable over said ramp.

6. The suspension handlebar assembly of claim 5, wherein the dial is located at a top end of the ramp.

7. The suspension handlebar assembly of claim 6, further comprising a cover covering the dial.

8. The suspension handlebar assembly of claim 7, further comprising a restraint strap configured to secure the dial in a desired position, such that unintentional changes in the stiffness of the damper are avoided.

9. A suspension handlebar assembly, comprising:

a handlebar;

a slider having a cross-sectional shape and centered along the handlebar and extending below the handlebar;

a stem having an upper surface, a first end, and a second end;

a ramp at the first end of the stem, the ramp having a top end and a bottom end and a cross-sectional shape sized smaller than said slider and slidable thereon, and the bottom end extending below the stem;

a connector at the second end of the stem; and an aperture at a junction of the handlebar and stem, the aperture allowing access to the top of the ramp, wherein the ramp is configured to engage the slider allowing for slideable movement between the ramp and the slider;

a spring and a damper located within the ramp and configured to absorb the impact of jolts; and a dial configured to adjust the stiffness of the damper.

10. The suspension handlebar assembly of claim 9, wherein the dial is located at the top end of the ramp.

11. The suspension handlebar assembly of claim 10, further comprising a cover covering the dial.

12. The suspension handlebar assembly of claim 11, further comprising a restraint strap configured to secure the dial in a desired position, such that unintentional changes in the stiffness of the damping apparatus are avoided.

* * * * *

UNITED STATES PATENT AND TRADEMARK OFFICE
CERTIFICATE OF CORRECTION

PATENT NO. : 12,344,345 B2  
APPLICATION NO. : 18/535901  
DATED : July 1, 2025  
INVENTOR(S) : Christopher William Huber Page 1 of 1

It is certified that error appears in the above-identified patent and that said Letters Patent is hereby corrected as shown below:

In the Claims

Claim 1, Column 6, Line 66, change "below the stem; and" to --below the stem;--.

Signed and Sealed this  
Eleventh Day of November, 2025

John A. Squires  
*Director of the United States Patent and Trademark Office*